United States Patent [19]

Simon

[11] Patent Number: 4,530,567

[45] Date of Patent: Jul. 23, 1985

[54] ROTARY OPTICAL CONNECTOR

[75] Inventor: Daniel Simon, Jeumont, France

[73] Assignee: Jeumont-Schneider Corporation, France

[21] Appl. No.: 377,816

[22] Filed: May 13, 1982

[30] Foreign Application Priority Data

May 14, 1981 [FR] France ................. 81 09600

[51] Int. Cl.³ ............................................. G02B 5/14
[52] U.S. Cl. .................... 350/96.20; 250/227; 250/551
[58] Field of Search ............. 350/96.20, 96.15, 486; 250/227, 551; 455/602

[56] References Cited

U.S. PATENT DOCUMENTS 4,178,515  12/1979  Tarasevich ............... 250/551
4,278,323  7/1981   Waldman ................. 350/96.20

FOREIGN PATENT DOCUMENTS

WO80/02750  11/1980  PCT Int'l Appl. .

OTHER PUBLICATIONS

Burke, et al.; "Fiber Optic Repeater Bypass Switch"; *IBM Technical Disclosure Bulletin*; vol. 18, No. 2, Jul. 1975; pp. 481, 482.

Primary Examiner—William L. Sikes
Assistant Examiner—Robert E. Wise
Attorney, Agent, or Firm—Rines and Rines, Shapiro and Shapiro

[57] ABSTRACT

A rotary optical connector comprises a light-emitting transmitter and a light receiver supported for relative rotation about a common axis. The emitter and receiver are coupled by a reflecting surface rotatable about the same axis in fixed relation to the receiver. The reflecting surface may be of regular prismatic configuration, in which case a set of parallel-connected receivers is employed, with a respective receiver corresponding to each side of the prismatic surface.

10 Claims, 3 Drawing Figures

ROTARY OPTICAL CONNECTOR

BACKGROUND OF THE INVENTION

The present invention relates to a rotary optical connector intended to transmit information optically between relatively rotatable light transmitting and receiving means; being more particularly directed to the optical transmission of data from at least one light-emitting transmitter which is radially mounted upon a hollow disc (or ring) to a corresponding receiver belonging to a set of receivers situated within the same plane as the aforementioned transmitter, inside a cylinder located along the same axis as the disc, and with said cylinder being capable of unimpeded rotary movement in relation to said disc.

An exemplary use of such a connector is the linking of two transmission cables in relation, for example, to a buoy floating on the surface of the ocean, with the opposite end of one cable being connected to monitoring and control units installed on service vessels which are anchored to the aforementioned buoy, and the opposite end of the other cable connected to drilling heads intended to operate on the ocean bottom. The cable which is used to transmit information, accordingly, must be connected to the buoy by means of a rotary type of connector to permit proper transmission regardless of rotary motion of the two cable sections in relation to one another.

Connections of this type have heretofore been established by means of pressure-activated electrical contacts consisting, for example, of brushes which rub against transfer discs immersed in oil. Nevertheless, the power which is provided for transmitting information, i.e., several milliamperes up to several volts, is unsuitable in terms of the voltage drops which are inherent in this type of connection, and the power is likewise subject to variations according to time.

SUMMARY OF THE INVENTION

An object of the present invention is to provide a new and improved rotary connector that eliminates such problems by use of a novel rotary optical system.

A further object is to provide a new and improved rotary optical apparatus for more general utility as well.

Other and further objects of the invention are hereinafter described and are more fully delineated in the appended claims.

In summary, in one of its aspects the invention provides a rotary optical connector which transmits information by optical means between at least one light-emitting transmitter radially mounted upon a hollow disc (or ring) and one of a plurality of receivers situated within the same plane as said transmitter inside a straight cylinder positioned along the same axis as said disc, with said cylinder being capable of rotating freely in relation to the aforementioned disc. The cylinder is designed so that it contains a reflecting inner portion which is circumscribed by the coaxial flat surface of a prism and a portion composed of transparent material surrounding the said prismatic surface. Along each side of said prismatic surface, a receiver facing toward the axis of said cylinder is centered along a straight line which is symmetrical with the axis in relation to said corresponding side of the surface, with all of these receivers being parallel-connected. It is preferable for the flat prismatic surface to possess three sides and to be circumscribed by the aforementioned cylinder, with only three receivers being required. Preferred details and a best mode embodiment are later presented.

The invention, including its functions, advantages and characteristics, will be fully understood with reference to the following description of preferred applications of the invention, which are cited in a non-restrictive form.

BRIEF DESCRIPTION OF THE DRAWINGS

The aforementioned description is accompanied by drawings in which.

DETAILED DESCRIPTION OF THE INVENTION

Figure 1:
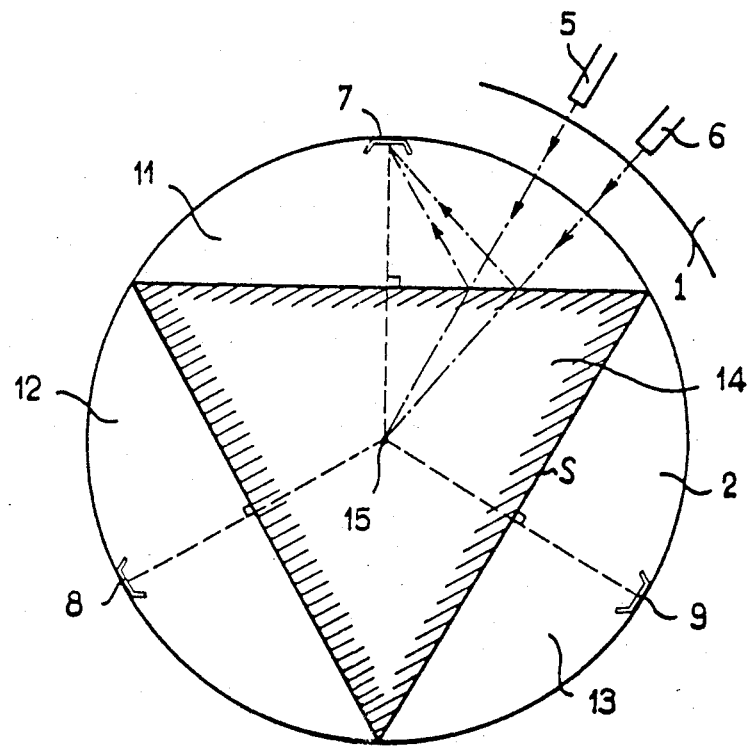
FIG. 1 is a schematic representation of a cross-section of a rotary optical connector in accordance with the present invention.

FIG. 1 illustrates a preferred embodiment of a rotary optical connector in accordance with the invention. In the form therein shown, the connector comprises a hollow disc (or ring) 1 and an internal coaxial cylinder 2 supported (by any suitable means) for relative rotation about their common axis 15. The connector further includes two parallel-connected transmitters 5, 6 which emit beams of light and which are shown radially mounted in a centripetal arrangement upon disc 1. These transmitters can consist of electro-optical transducers, for example, if the cable to which they are parallel-connected is not of the optical type, or it is possible to use lasers, diodes, etc. Attached to the cylinder 2 is a set of light receivers 7, 8, 9, the reception axes of which are situated within the same plane as the axes of the transmitters 5, 6. The receivers may be photoelectric cells, for example.

The cylinder 2, positioned along the same axis as the disc 1, consists of an inner portion 14 circumscribed by a coaxial flat polygonic prismatic surface S which possesses reflective properties. In the illustrative example of FIG. 1, the prismatic surface S has three sides and is surrounded by transparent material 11, 12, 13. These sides can be covered with a reflecting film in order to improve transmission capability.

With continuing reference to FIG. 1, it will be observed that each of the receivers 7, 8, 9 faces the axis 15 of cylinder 2 and is radially arranged (outward of the surface S) along a straight line which is symmetrical with the axis 15 in relation to a corresponding side of the prismatic surface S. In other words, each receiver is located along a line passing perpendicularly through the axis 15 and the corresponding side of the surface S. Obviously, all of the receivers are parallel-connected. Also, it will be appreciated that because the receivers are attached to the cylinder, they will rotate about axis 15 in fixed relation to the surface S.

Consequently, any beam of light emitted by a transmitter is generally reflected by one of the sides of the reflective inner portion or section 14 to the corresponding one of the receivers.

Nevertheless, when only one of the transmitters is employed, for example the transmitter identified at 5, none of the receivers can receive a beam of light when said transmitter and the axis 15 are aligned with one of the receivers or with a corner of the said prismatic surface. Accordingly, it is preferable to employ at least two parallel-connected transmitters 5 and 6 of the type shown in the drawing, with these transmitters being separated from one another, in the manner shown, by a distance established in such a manner that at least one beam of light can always travel to a receiver, regardless of the relative rotary positions of the disc 1 and the cylinder 2. If the two transmitters 5, 6 are properly positioned at the same distance from the axis 15, beams of light emitted by these transmitters will travel along identical trajectories, and the system is not affected by phase displacement in terms of the signals being emitted.

Figure 2:
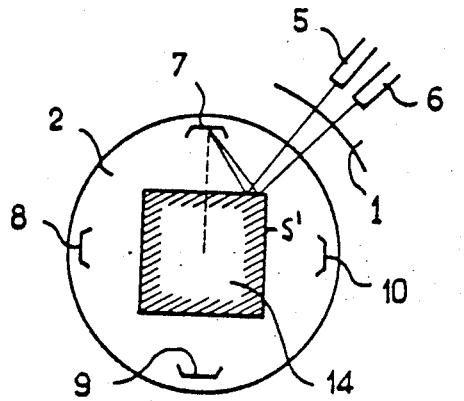
FIG. 2 is a schematic representation of a cross-section of another embodiment of a rotary optical connector in accordance with the invention.

FIG. 2 shows another embodiment of the invention which is a variation of the form illustrated in FIG. 1. In the embodiment of FIG. 2, a prismatic surface S' having four sides is employed, with an additional receiver 10 having been included corresponding to the fourth side of surface S'. The elements of this embodiment are positioned in the manner described in connection with FIG. 1.

Figure 3:
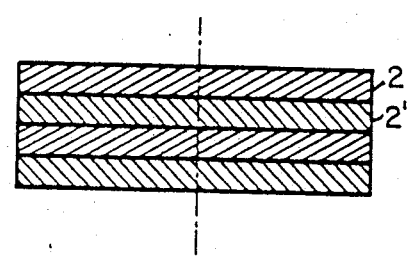
FIG. 3 schematically represents an axial section of a rotary optical connector in accordance with the invention, whereby transmitting of information on several channels is possible.

It is also possible, as shown in FIG. 3, to provide a rotary optical connector intended for multiple transmitting channels by employing a minimum thickness for each cylinder and by axially combining several cylinders 2, 2¹, etc. In this instance, it is obviously possible to provide co-planar transmitters which correspond to each transmitting channel.

An optical connector in accordance with the present invention can be employed when there is relative rotary motion of a random nature, as in the instance of controlling off-shore drill heads, as well as in situations where relative rotary motion is rapid and consistent. Although only two applications of the present invention have been described, it is obvious that modifications may be introduced by technically knowledgeable persons in accordance with the same principles which would not represent departures from the scope of this invention. For example, it is possible for the inner reflective portion to have the shape of a regular polygon possessing more than three or four sides, with the number of receivers being equal to the number of sides of said polygon. Other modifications will also occur to those skilled in the art and are considered to fall within the spirit and scope of the invention as defined in the appended claims.

What is claimed is:

1. A rotary optical connector comprising light-emitting transmitter means and light-receiving means supported for relative rotation about a common axis, said transmitter means being directed for emitting light toward said axis and located at a greater distance from said axis than said receiving means, and reflector means supported inward of said receiver means relative to said axis for rotation about said axis in fixed relation to said receiver means, said reflector means being oriented for reflecting the light emitted toward said axis by said transmitter means to said receiver means during rotation of said transmitter means relative to said receiver means.

2. A connector in accordance with claim 1, wherein said transmitter means and said receiver means are supported for rotation in a plane perpendicular to said axis, said transmitter means being directed radially inward of said axis.

3. A connector in accordance with claim 2, wherein said reflector means comprises a reflecting surface of regular prismatic configuration, with its axis coincident with the first-mentioned axis, and wherein said receiver means comprises a plurality of parallel-connected light receivers, with each of said receivers being located on a line perpendicular to the first-mentioned axis and to a respective corresponding side of said reflecting surface.

4. A connector in accordance with claim 3, wherein said transmitting means is supported by ring means, wherein said reflecting surface and said receivers are supported by cylinder means coaxially disposed within said ring means, said ring means and said cylinder means being supported for relative rotation about their common axis, and wherein said reflecting surface is surrounded by transparent material.

5. A connector in accordance with claim 4 mounted upon one or more similar connectors, with the respective cylinder means of said connectors being stacked one upon another and corresponding transmitter means being mounted about the respective cylinder means co-planar with its associated receivers.

6. A connector in accordance with claim 3, wherein said transmitting means comprises a pair of light-emitting transmitters connected in parallel, said transmitters being directed radially inward of the first-mentioned axis and spaced from one another at a distance whereby light from at least one of said transmitters is reflected to one of said receivers regardless of the relative rotational positions of said transmitters and said receivers.

7. A rotary optical connector comprising a ring, a cylinder coaxially disposed within said ring and a light-emitting transmitter mounted upon said ring for directing light radially inward of said cylinder, said cylinder and said ring being supported for relative rotation about their common axis, said cylinder including an internal coaxial reflecting surface of regular prismatic configuration surrounded by transparent material and positioned for impingement on its sides of the radially directed light from said transmitter, said cylinder further including a plurality of parallel-connected light receivers located in a common plane with said transmitter and corresponding respectively to the sides of said reflecting surface, with each receiver facing said axis and lying along a line passing perpendicularly through said axis and the corresponding side of said reflecting surface for receiving light emitted by said transmitter and reflected by said corresponding side.

8. A connector in accordance with claim 7, wherein said reflecting surface has three sides.

9. A connector in accordance with claim 7, further comprising an additional light-emitting transmitter connected in parallel with the first-mentioned transmitter and mounted upon said ring at the same distance from said axis, said additional transmitter being directed radially inward of said cylinder and spaced laterally from the first-mentioned transmitter, whereby the radially directed light from at least one of said transmitters is reflected to one of said receivers regardless of the relative rotational positions of said ring and said cylinder.

10. A connector in accordance with claim 7 mounted upon one or more similar connectors, with the cylinders of the connectors being stacked one upon another and corresponding transmitters being mounted about each cylinder co-planar with its associated receivers.

* * * * *